(12) United States Patent
Ylitalo

(10) Patent No.: US 7,894,857 B2
(45) Date of Patent: Feb. 22, 2011

(54) METHOD INCLUDING A RADIO TRANSMITTER FOR IMPROVING RADIO LINK OPERATION

(75) Inventor: Juha Ylitalo, Oulu (FI)

(73) Assignee: Nokia Siemens Networks OY, Espoo (FI)

( * ) Notice: Subject to any disclaimer, the term of this patent is extended or adjusted under 35 U.S.C. 154(b) by 1438 days.

(21) Appl. No.: 10/209,195

(22) Filed: Aug. 1, 2002

(65) Prior Publication Data
US 2003/0040337 A1 Feb. 27, 2003

Related U.S. Application Data

(63) Continuation of application No. PCT/FI01/00201, filed on Feb. 28, 2001.

(30) Foreign Application Priority Data
Mar. 1, 2000 (FI) .................................. 20000476

(51) Int. Cl.
*H04M 1/00* (2006.01)
*H04B 1/00* (2006.01)

(52) U.S. Cl. ................. 455/562.1; 455/63.4; 455/67.11; 342/372

(58) Field of Classification Search ................. 455/561, 455/562.1, 63.1, 63.4, 67.11, 67.13, 456.1; 342/371, 372; 370/344
See application file for complete search history.

(56) References Cited

U.S. PATENT DOCUMENTS 5,396,256 A * 3/1995 Chiba et al. ................. 342/372
5,856,804 A * 1/1999 Turcotte et al. ............. 342/371
6,788,661 B1 * 9/2004 Ylitalo et al. ............... 370/334

FOREIGN PATENT DOCUMENTS

| FI | 00818060 | 5/2000 |
|----|----------|--------|
| JP | 59-190677 A | 10/1984 |
| JP | 1-311704 | 12/1989 |
| JP | 6-29719 | 2/1994 |
| JP | 8-274687 A | 10/1996 |
| JP | 10-70502 | 3/1998 |

(Continued)

OTHER PUBLICATIONS

Proakis et al., "Introduction to Signal Processing," New York: Macmillian Publishing Company, 1988-1989, pp. 682-730 with table of contents.

(Continued)

*Primary Examiner*—Quochien B Vuong
(74) *Attorney, Agent, or Firm*—Harrington & Smith

(57) ABSTRACT

The invention relates to a method and a system for improving operation of a radio link in a wireless communication system, such as a cellular radio system, by modifying the radiation pattern of an antenna array on the downlink by means of the information obtained from the uplink. The method comprises determining the location of a receiver for transmission by means of an angular power spectrum (400), for example. Then the radiation pattern of a transmitting antenna array is shaped on the basis of the location information on the receiver by selecting a window function which provides the desired radiation pattern and by implementing the form of the window function by means of antenna element specific coefficients (502, 504).

46 Claims, 5 Drawing Sheets

FOREIGN PATENT DOCUMENTS

| | | |
|---|---|---|
| JP | 10-242737 | 9/1998 |
| JP | 11-215543 | 8/1999 |
| WO | WO 97/00543 | 1/1997 |
| WO | WO 97/11537 | 3/1997 |
| WO | WO 97/45968 | 12/1997 |

OTHER PUBLICATIONS

N. Kikuma, "Adaptive Signal Processing by Array Antenna," Kagaku Gijyutsu Shuppan, p. 178-181, (Nov. 25, 1998).

* cited by examiner

METHOD INCLUDING A RADIO TRANSMITTER FOR IMPROVING RADIO LINK OPERATION

This application is a continuation of international application PCT/FI01/00201 filed Feb. 28, 2001, which designated the US and was published under PCT article 21(2) in English

FIELD OF THE INVENTION

The invention relates to a method and a system for improving operation of a radio link in a wireless communication system, such as a cellular radio system.

BACKGROUND OF THE INVENTION

As the number of users of wireless communication systems, such as cellular radio systems, increases and fast data transmission becomes more common in these systems, it is vitally important to increase the capacity of the systems by improving their performance. One way to solve this problem is to use one or more adaptive antenna arrays instead of sector antennas. In an antenna array individual antenna elements are typically located close to one another, i.e. at a distance corresponding to about half a wavelength. Such arrays typically comprise as many antennas as are needed to achieve the desired coverage area.

Since sampling in the frequency domain causes folding in the time domain, a signal is usually divided into N samples and a discrete Fourier transformation DFT is calculated. An FFT (Fast Fourier Transformation) is an algorithm for reducing the number of complex multiplications needed to calculate the DFT. A particularly efficient calculation algorithm is obtained when N is a power of two. To facilitate the Fourier transformation, an antenna array usually comprises a number of antennas that is divisible by 2. The DFT and the FFT are described more closely in Proakis and Manolakis: *Introduction to Digital Signal Processing*, pp. 682-730.

When adaptive antenna arrays are used, the basic principle is to use narrow antenna beams that are directed towards the desired receiver as directly as possible. The generally known methods used with adaptive antenna arrays can be divided into two main groups: radiation beams are directed towards the receiver, or the most suitable beam is selected from among several alternative beams. A suitable beam is selected for downlink transmission, or the beam is turned on the basis of the information received from the uplink. The reuse of frequencies can be increased and the power of transmitters reduced because the interferences caused for other users decrease thanks to directivity of the antenna beams.

In a digital system antenna beams are directed by dividing a signal into I and Q branches in baseband parts and by multiplying the signal of each antenna element by suitable weighting coefficients in a complex manner (phase and amplitude) and then adding the output signals of all antenna elements together. In this case the adaptive antenna array comprises, in addition to the antennas, a signal processor which automatically adapts antenna beams by means of a control algorithm by turning the antenna beams towards the signal that was the strongest of the measured signals. Directivity of the beams can also be implemented analogously by using fixed phasing circuits (Butler matrix) for generating orthogonal radiation beams, in which the phase increases antenna by antenna. According to the method, it is simply measured which beam receives the largest amount of signal energy, i.e. with which beam the signal is the strongest, and this beam is selected for transmission.

A method where a directed antenna beam is widened is also known. According to this method, the incidence angle of the directed antenna array is formed in the base station system on the basis of a signal received from the uplink employing a prior art estimation method. The base station system transmits a signal to a subscriber terminal in the direction of the angle of departure formed from the incidence angle. To determine the width of the antenna's main beam, a ratio is calculated, which describes the unbalance between the uplink traffic and the downlink traffic, i.e. the differences in the amount of traffic within a certain period. The method is intended for use mainly in transmission of packet traffic.

A disadvantage of the method described above is that it is impossible to influence the level of side beams and thus the interference caused to other antenna sectors. Furthermore, the extent to which the main beam can be modified is relatively limited.

BRIEF DESCRIPTION OF THE INVENTION

The object of the invention is to provide a method and an apparatus implementing the method which allow to change the radiation pattern of an antenna array appropriately. This is achieved with a method of improving operation of a radio link, the method comprising using an antenna beam directed by an antenna array to establish a radio link and determining the directions of arrival of a received signal. The method according to the invention comprises shaping the radiation pattern of a transmitting antenna array on the basis of the directions of arrival of the received signal by selecting a window function which provides the desired radiation pattern of the antenna array and by implementing the form of the window function by means of antenna element specific coefficients.

The invention also relates to a radio system which comprises: a network part of the radio system, a subscriber terminal and a bi-directional radio link between the network part of the radio system and the subscriber terminal, which is established utilizing an antenna beam directed by an antenna array, the system comprising a radio transmitter which comprises means for determining the directions of arrival of a received signal. In the system according to the invention a radio transmitter comprises means for shaping the radiation pattern of a transmitting antenna array on the basis of the directions of arrival of the received signal by selecting a window function which provides the desired radiation pattern and by implementing the form of the window function by means of antenna element specific coefficients.

The invention further relates to a radio transmitter which comprises means for determining the directions of arrival of a received signal. The radio transmitter of the invention comprises means for shaping the radiation pattern of a transmitting antenna array on the basis of the directions of arrival of the received signal by selecting a window function which provides the desired radiation pattern and by implementing the form of the window function by means of antenna element specific coefficients.

The invention also relates to a method of improving operation of a radio link, the method comprising using an antenna beam directed by an antenna array for establishing a radio link and locating a receiver. The method of the invention comprises shaping the radiation pattern of the transmitter's transmitting antenna array on the basis of the location information on the receiver by defining a number of antenna element specific coefficients which provide the desired width of the main beam as zeros.

The invention also relates to a radio system which comprises: a network part of the radio system, a subscriber terminal and a bi-directional radio link between the network part of the radio system and the subscriber terminal, which is established utilizing an antenna beam directed by an antenna array, the system comprising a radio transmitter, which comprises means for locating a receiver. In the system according to the invention the transmitter comprises means for shaping the radiation pattern of the transmitter's transmitting antenna array on the basis of the location information on the receiver by defining a number of antenna element specific coefficients which provide the desired width of the main beam as zeros.

The invention further relates to a radio transmitter which comprises means for locating a receiver. The radio transmitter of the invention comprises means for shaping the radiation pattern of the transmitter's transmitting antenna array on the basis of the location information on the receiver by defining a number of antenna element specific coefficients which provide the desired width of the main beam as zeros.

The preferred embodiments of the invention are disclosed in the dependent claims.

The method and arrangement of the invention provide several advantages. The traditional beamforming methods, which employ balanced weighting of signals of different antenna elements, provide a radiation pattern which has the narrowest possible main antenna beam. Such a radiation pattern is ideal for the AWGN channel. However, in several radio systems the angular spread of the signal received from the uplink is often greater than the width of the main beam of the transmitting antenna in the downlink, which results in poor operation of the downlink. By shaping the main beam it is possible to compensate for the antenna's directional inaccuracy, i.e. the fact that the desired receiver cannot be located accurately, which can happen in the case of a mobile receiver, for example. A receiver located at the edge of an antenna sector can also be reached better by shaping the radiation pattern. In addition, reduction of the level of side beams decreases the interference caused to the other antenna sectors of the same system and to other systems. Shaping of the main beam and reduction of the level of side beams also allow to decrease the transmission power, which increases the dynamics of transmission power. Furthermore, less transmission power is wasted on the side beams.

BRIEF DESCRIPTION OF THE DRAWINGS

The invention will be described in greater details by means of preferred embodiments with reference to the accompanying drawings, in which.

DETAILED DESCRIPTION OF THE INVENTION

Figure 1:
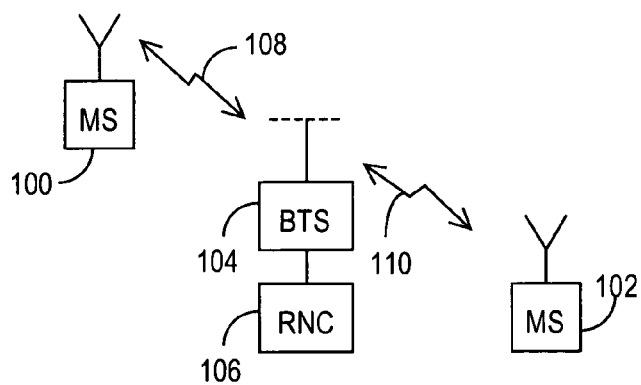
FIG. 1 illustrates a telecommunications system.

The present invention can be applied in various wireless communication systems, such as cellular radio systems. It is irrelevant which multiple access method is used. For example, the CDMA (Code Division Multiple Access), the WDCMA (Wideband Code Division Multiple Access) and the TDMA (Time Division Multiple Access) or their hybrids can be used. It is also clear to a person skilled in the art that the method according to the invention can be applied to systems utilizing different modulation methods or air interface standards. FIG. 1 is a simplified illustration of a digital data transmission system to which the solution according to the invention is applicable. This is part of a cellular radio system, which comprises a base station 104, which has a bi-directional radio link 108 and 110 to subscriber terminals 100 and 102. The subscriber terminals may be fixed, placed in a vehicle or portable. The base station includes transmitters, for instance. From the transceivers of the base station there is a connection to an antenna unit, which establishes the bi-directional radio link to the subscriber terminal. The base station is further connected to a base station controller 106, which transmits the connections of the terminals to the other parts of the network. The base station controller controls centrally several base stations connected to it.

The cellular radio system can also communicate with a public switched telephone network, in which case a transcoder converts the different digital coding formats of speech used between the public switched telephone network and the cellular radio network into compatible formats, e.g. from the format of the fixed network (64 kbit/s) into a format of the cellular radio network (e.g. 13 kbit/s) and vice versa.

Figure 2:
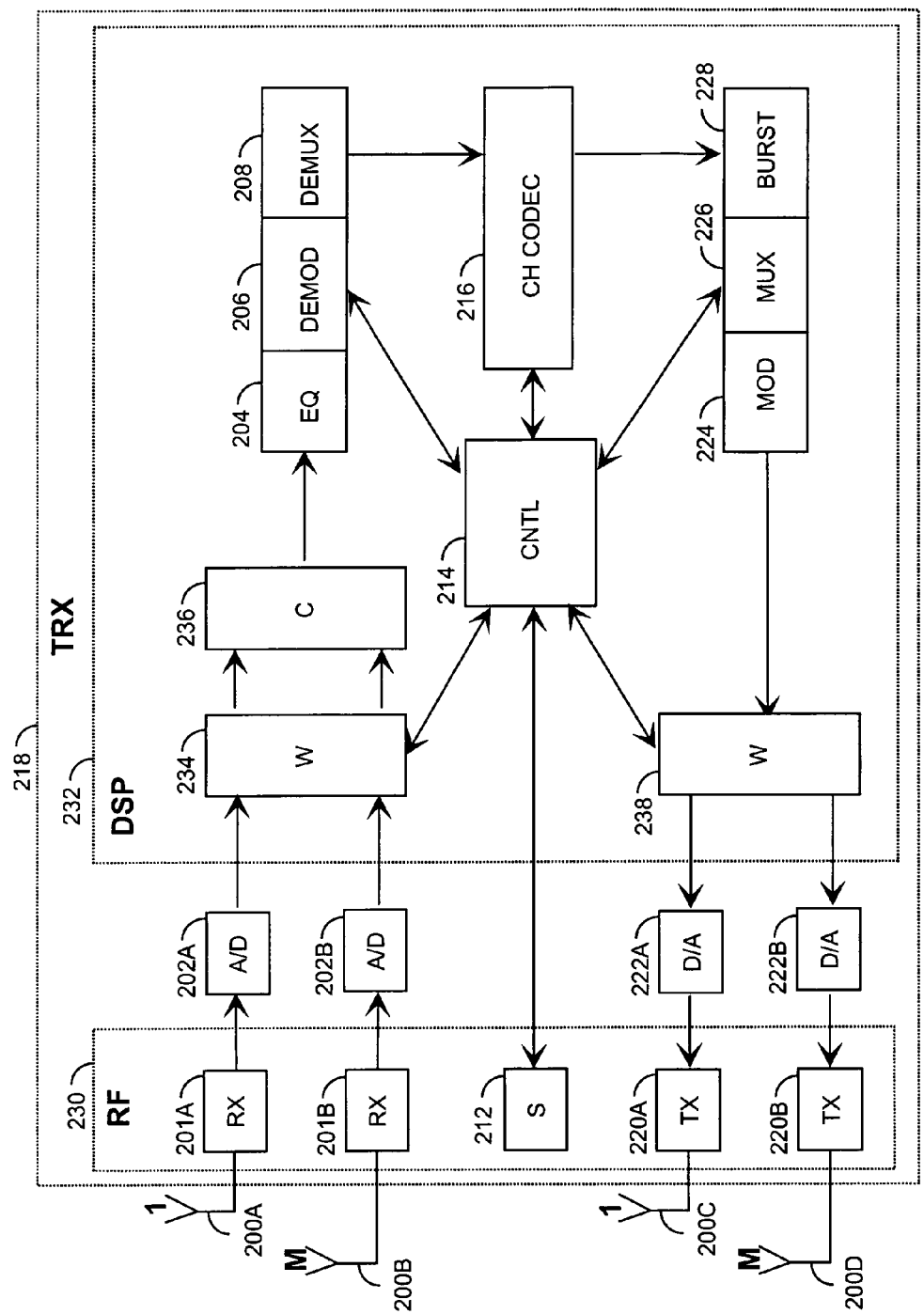
FIG. 2 illustrates a transceiver in which the invention can be applied.

FIG. 2 illustrates the structure of a transceiver 218 of a base station 104 in accordance with the TDMA in greater detail. An antenna array, which utilizes directed antenna beams, comprises various elements 200A, 200B, e.g. eight different elements which are used for directing an antenna beam at the receiving end. There can be M antenna elements, M being an integer greater than one. The same antenna elements can be used both for transmission and reception, or, as shown in FIG. 2, different antenna elements 200C, 200D are used for transmission. The antenna elements are arranged either linearly or planarly.

In the linear case, the elements can be arranged in such a manner that they form a ULA (Uniform Linear Array), where the elements are in a straight line at equal distances. In the planar case, a CA (Circular Array), for example, is formed, where the elements are on the same plane forming a circle circumference in the horizontal direction. In that case a certain sector of the circle is covered, e.g. 120 degrees or even the full circle, i.e. 360 degrees. In principle, the above-mentioned uniplanar antenna structures can also be implemented as two or three dimensional structures. For example, a two-dimensional structure is achieved by placing ULA structures next to one another, and thus the elements form a matrix.

A multi-path propagated signal is received via the antenna elements. Each antenna element has receivers 201A, 201B of its own, which are radio frequency parts 230.

The receiver 201 comprises a filter which prevents frequencies outside the desired frequency band. After this the signal is converted into an intermediate frequency or directly into the baseband frequency, in which form the signal is sampled and quantisized in an analog/digital converter 202A, 202B.

Multi-path propagated signals expressed in complex form are then supplied to a digital signal processing processor and its software 232. The antenna pattern of the received signal is directed using digital phasing of the signal, and thus the antenna elements do not need to be mechanically directable. In that case the direction of the subscriber terminal 100, 102 is expressed as a complex vector, which is formed from elementary units corresponding to the antenna elements. The elementary units are usually expressed as complex numbers. Each separate signal is multiplied by the elementary unit of the antenna element in weighting means 234. After this the signals can be combined in combining means 236.

Signal phasing can also be performed on a radio-frequency signal or on an intermediate-frequency signal, if such is used. In that case the weighting means 234 are located at the radio frequency parts 230 or between the radio frequency parts and the analog/digital converters 202, 202B.

A channel equalizer 204 compensates for interferences, e.g. interferences caused by multi-path propagation. A demodulator 206 extracts the bit flow from a channel-equalized signal, which is transmitted to a demultiplexer 208. The demultiplexer 208 divides the bit flow extracted from different time slots into separate logical channels. A channel codec 216 decodes the bit flow of different logical channels, i.e. decides whether the bit flow consists of signalling information, which is transmitted to a control unit 214, or whether the bit flow consists of speech, which is transmitted to the speech codec of the base station controller 106. The channel codec 216 also corrects errors. The control unit 214 performs internal controlling tasks by controlling different units.

At the transmitting end a burst generator 228 adds a training sequence and tail bits to data arriving from the channel codec 216. It should be noted that the transmitter is provided with a burst generator only in systems where transmission consists of bursts. In the transmitter described according to the TDMA system, the multiplexer 226 assigns a time slot to each burst. The modulator 224 modulates digital signals into a radio-frequency carrier wave. In weighting means 238 the signal is multiplied by the elementary elements corresponding to the antenna elements. According to the preferred embodiment of the invention, the signal can also be multiplied by a weighting coefficient, which is selected so that it follows the form of the desired window function. This allows to direct the antenna beam towards the complex vector formed by the elementary units in digital phasing.

The signal is converted from the digital form into the analog form by a digital/analog converter 222A, 222B. Each signal component is transmitted to a transmitter 220A, 220B corresponding to the antenna element in question.

The transmitter comprises a filter for limiting the bandwidth. The transmitter also controls the output power of transmission. A synthesizer 212 provides the necessary frequencies for the different units. The clock included in the synthesizer can be controlled locally or centrally from somewhere else, e.g. from the base station controller 106. The synthesizer generates the necessary frequencies by means of a voltage-controlled oscillator, for instance.

Figure 3:
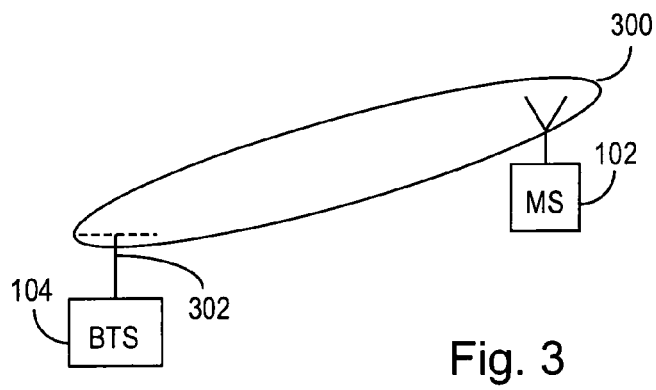
FIG. 3 illustrates use of directed antenna beams.

FIG. 3 illustrates use of directed antenna beams. For the sake of clarity, the figure shows only one directed antenna beam 300. In the FDD system (Frequency Division Duplex) different frequencies are used on the uplink and on the downlink. Due to fading, determination of the directions of optimal burst-specific beams on the downlink is unreliable. The base station system 104, however, needs to know in which direction the subscriber terminal 102 is. This information is produced according to the prior art in the GSM system (Global System for Mobile Communication), for example, employing a known training sequence included in the signal received from the uplink. In CDMA systems the directions of arrival of the received signal and thus the location of the receiver can be determined correspondingly according to the prior art on the basis of the pilot signal received from the uplink. It should be noted that if there is no visual contact between the transmitter of the subscriber terminal and the receiver of the base station, the signal arriving from the terminal is not always in the same direction as the terminal itself. In respect of the antenna array 302 the direction is expressed e.g. as an angle in relation to the geographical west-east axis.

Figure 4:
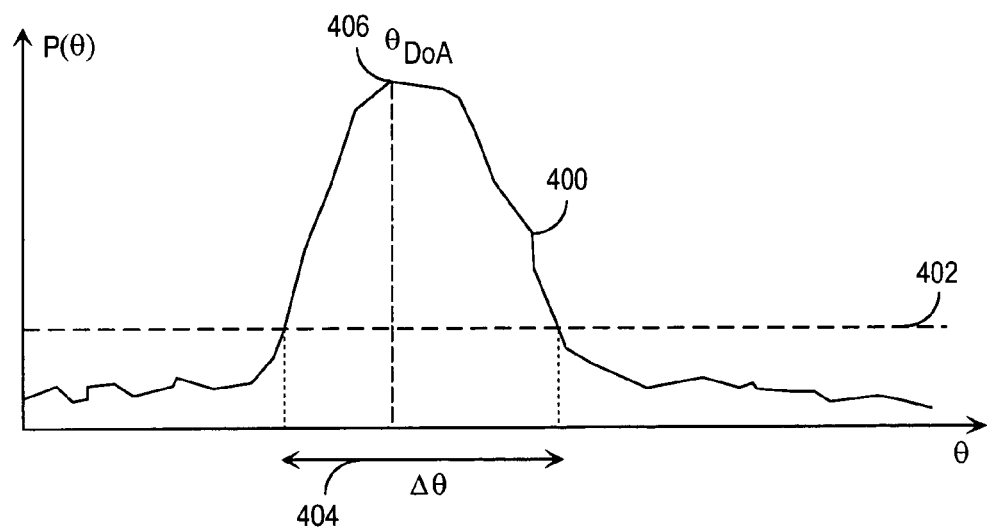
FIG. 4 illustrates measurement of angular spread on the uplink.

Methods known as blind estimation methods can also be used. In these methods the signal does not need to include known parts. The methods comprise calculating the direction from which the strongest signal is received. FIG. 4 illustrates one direction estimation method (Direction of Arrival, DoA). In the method shown estimation yields the angular power spectrum $P(\theta)$ of the received signal as a function 400 of the angle $\theta$. Angular spread refers to a set of angles $\theta$ with which the power $P(\theta)$ of impulse response exceeds a selected threshold value 402. In FIG. 4 the angular spread is marked with arrow 404. It is usually advantageous to select the incidence angle $\theta_{DoA}$ from which the strongest signal 406 was received as the angle of transmission. In this method the Fourier transformation can be used for estimating the angles of arrival. In the case of the GSM system, for example, the angular power spectrum can be estimated by correlating the received signal with the known training sequence as a function of the angle of arrival. Angles with correlation peaks, i.e. the direction from which a strong signal was received, can be seen from the angular power spectrum. Application of the method according to the invention is independent of the method used for determining the directions of arrival of the received signal.

Figure 5:
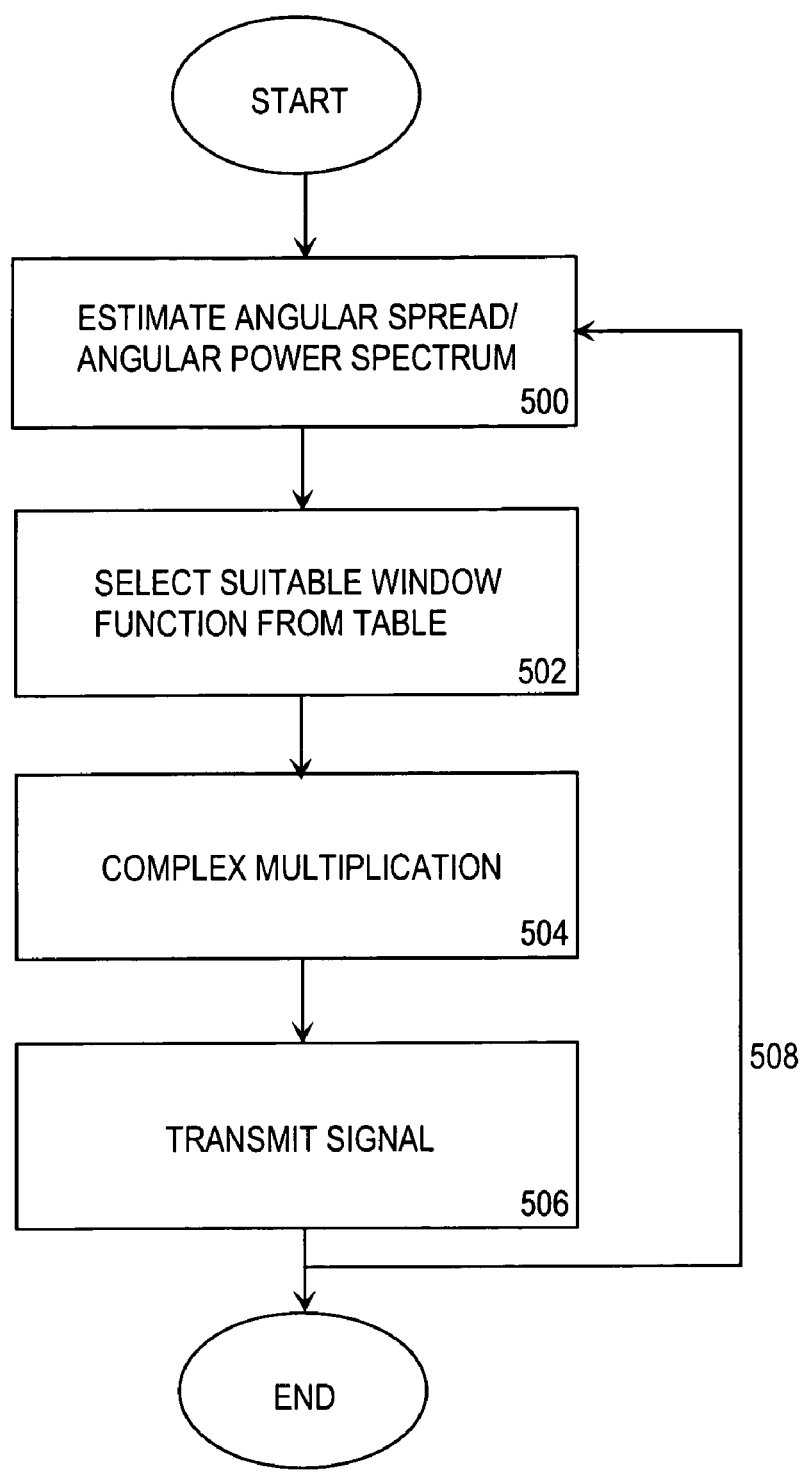
FIG. 5 is a flow chart illustrating a preferred embodiment of the invention.
Figure 6:
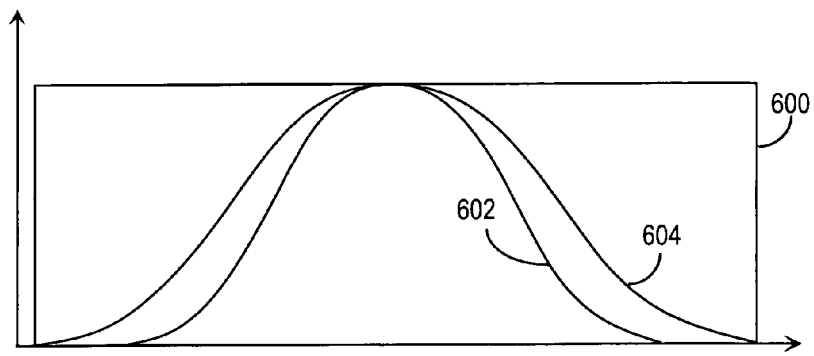
FIG. 6 illustrates various window functions in the time domain.

FIG. 5 is a flow chart illustrating an example of the procedures applied in transmission. In block 500 the directions of arrival of the received signal are estimated by a method described above, e.g. by determining the angular power spectrum or the angular spread. For example, if the angular spread is great, a window function which modifies the radiation pattern of the antenna array as desired is selected from among pre-tabulated window functions in block 502. Window functions are commonly used in designing of filters, and consequently there are several prior art window functions which can be employed in the method according to the invention. FIG. 6 is a rough illustration of a rectangular window 600, a Blackman window 602 and a Hamming window 604 in the time domain. Various window functions and their frequency responses are described in the literature (e.g. Proakis, Manolakis: *Introduction to Digital Signal Processing*, pp. 546-559).

The input signal of each transmitting antenna has the form $Ae^{j\theta}$, where A is the weighting coefficient and $\theta$ determines the direction of the antenna beam. Thus in block 504 the input signal of each antenna element is multiplied by coefficients which provide the window function selected by means of complex multiplication. The weighting coefficients A are calculated in a DSP processor and complex multiplication is performed in the radio frequency parts.

In block 506 a signal is transmitted after the radiation pattern of the transmitting antenna has been shaped as described above.

Feedback 508 describes adaptivity of the method, which is important e.g. when the receiver moves.

Figure 7:
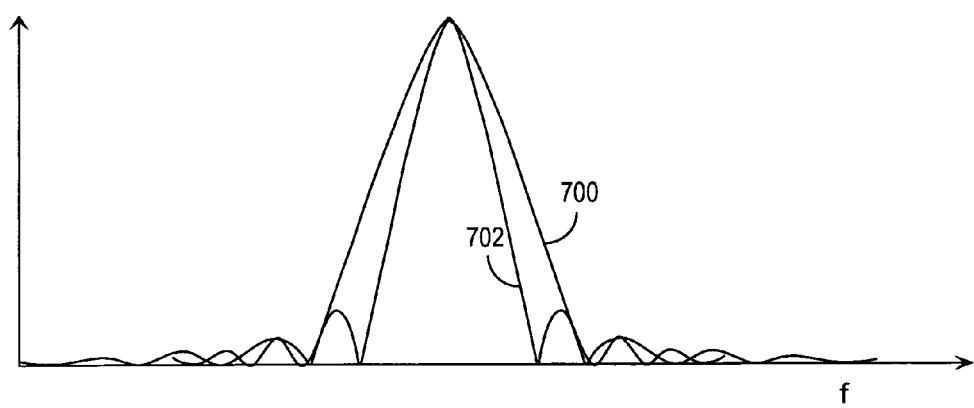
FIG. 7 illustrates the shape of radiation patterns obtained by means of a rectangular window function and a Gaussian window function.

The shape of the antenna's radiation pattern is determined by the Fourier transformation of the window function used. FIG. 7 is a rough illustration of the absolute value 700 of the Fourier transformation of a Gaussian window function and the absolute value of the Fourier transformation of a rectangular window function. The Fourier transformation of the rectangular window follows the sinc function and is an ideal solution for the AWGN channel. The main beam of the Gaussian window is wider and the side beams can be adjusted to a lower level than with the rectangular window, and thus the Gaussian window is better when there is interference on the channel. In reality, channels always contain more or less interference. The selection of the window function to be used depends on the type of the radiation pattern which should be provided for the antanna array. Different window functions adapt the width of the main beam and/or the level of the side beams differently.

When the weighting coefficients are selected using the window function, the beam width can be easily doubled or tripled, but greater beam widths require reduction of the number of transmission antennas. This is achieved by defining the weighting coefficient of a desired number of antenna elements as zero. For example, if the antenna array comprises 16 antenna elements, the beam width is about 5 degrees. Using a suitable window function the beam can be widened to 15 degrees, but by giving 12 the value zero to the weighting coefficient of the antenna element, the antenna elements used 4 provide a beam which may even equal the whole width of sector. It should be noted that the value zero can be given as the weighting coefficient to some antenna elements to achieve the desired form of the window function.

Figure 8:
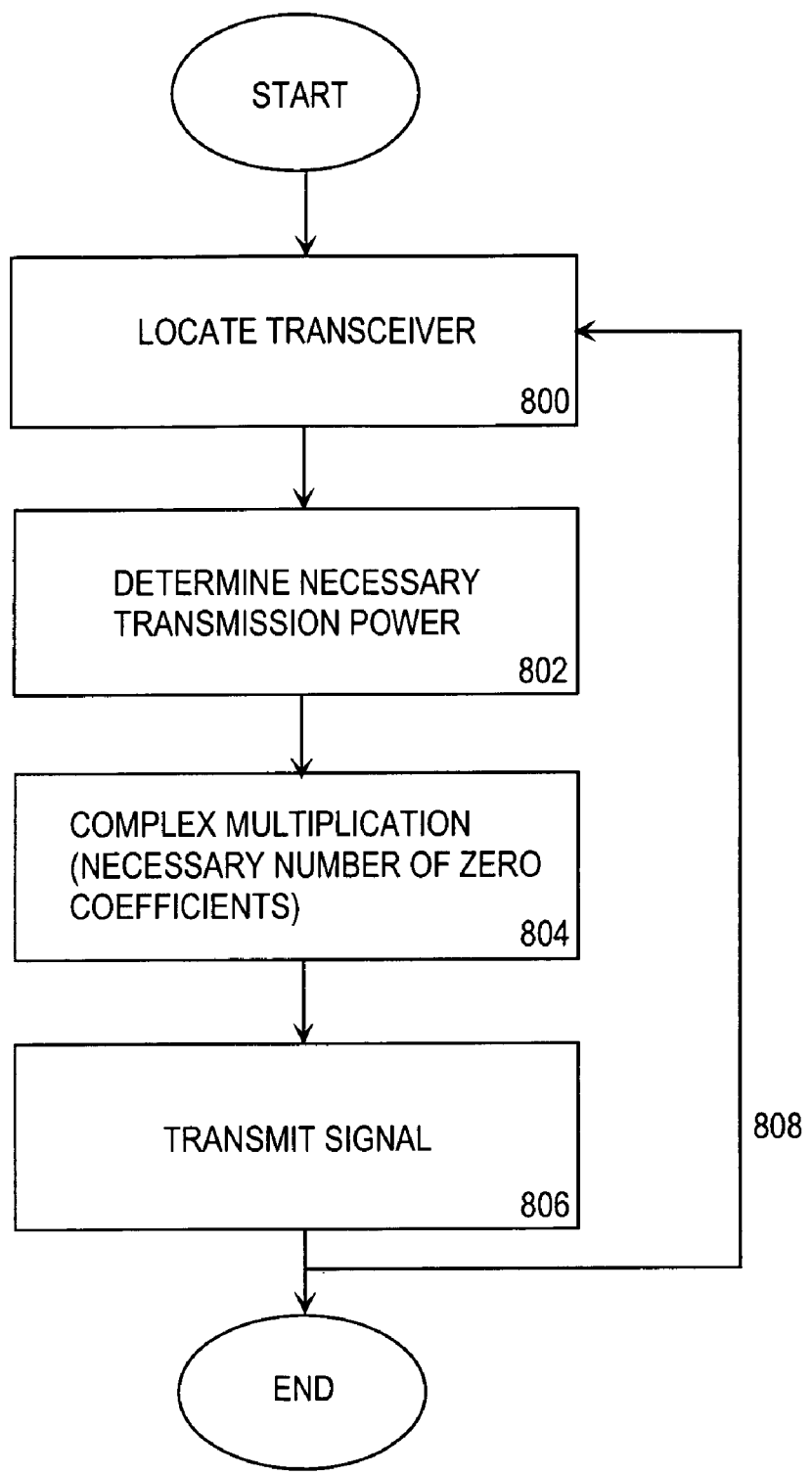
FIG. 8 is a flow chart illustrating another embodiment of the invention.

FIG. 8 is a flow chart illustrating another embodiment. This embodiment employs various methods intended for use in existing and future radio systems to locate a receiving radio device. An example of these is the timing advance determined from the training sequence in the GSM system, for example. The timing advance indicates the time delay between the subscriber terminal and the base station. Other measurements performed by the base station on the subscriber terminal can also be utilized. Furthermore, other methods, such as the GPRS satellite location method, are applicable.

In block 800 the receiving radio device is located e.g. by determining the distance between the transmitter and the receiver by one of the above-mentioned methods or by a combination of several methods. Methods other than those mentioned above can also be used. If the receiving radio device is close to the transmitting radio device, the transmission power needed is estimated in block 802. The transmission power is decreased in block 804 by reducing the number of antenna elements used in the antenna array by multiplying a suitable number of input signals of the antenna elements by zero coefficients. A signal is transmitted in block 806 after the transmission power of the transmitter has been adjusted as described above.

Feedback 808 describes adaptivity of the method, which is important e.g. when the receiver moves from one place to another.

The invention is not only applicable to a situation where the subscriber terminal moves, but also to a situation where the subscriber terminal does not move. The radio channel changes constantly as a function of time. In that case the channel quality can be improved by widening the beam e.g. when the subscriber terminal is located in a car and the car drives behind a large obstacle, such as a hill, which prevents direct visual contact to the base station antenna. In that case a very narrow and accurately directed beam is used. If a lorry drives in front of the car, preventing direct visual contact to the antenna, the quality of the radio link naturally deteriorates. The radio link quality can be improved by widening the directed antenna beam.

Even though the invention has been described above with reference to an embodiment according to the accompanying drawings, it is clear that the invention is not limited to it, but may be modified in various ways within the scope of the inventive concept disclosed in the appended claims.

I claim:

1. A method of improving operation of a radio link, the method comprising using an antenna beam directed by an antenna array to establish a radio link, determining the directions of arrival of a received signal, shaping the radiation pattern of a transmitting antenna array on the basis of the directions of arrival of the received signal by selecting a window function which provides the desired radiation pattern of the transmitting antenna array and by implementing the form of the window function by antenna element specific coefficients, wherein the level of side beams in the transmitting antenna array is determined according to the load in other antenna sectors of the same system and according to the interference level in other radio systems.

2. A method according to claim 1, wherein the shape of the main beam is changed by modifying the radiation pattern.

3. A method according to claim 1, wherein the level of side beams is reduced by modifying the radiation pattern.

4. A method according to claim 1, wherein the directions of arrival of the received signal are determined by means of angular spread.

5. A method according to claim 1, wherein the directions of arrival of the received signal are determined by means of an angular power spectrum.

6. A method according to claim 1, wherein in that the level of side beams in the transmitting antenna array is determined according to the load in the adjacent antenna sector of the same system.

7. A method according to claim 1, wherein the dynamics of power control is increased by reducing the level of side beams in the transmitting antenna array.

8. A method according to claim 1, wherein the dynamics of power control is increased by modifying the main beam in the transmitting antenna array.

9. A method according to claim 1, wherein the window function is selected from among pre-tabulated window functions.

10. A method according to claim 1, wherein a signal output of each antenna element of the antenna array is multiplied by coefficients providing the selected window function.

11. A method according to claim 1, wherein the shape of the antenna's radiation pattern is determined by the Fourier transformation of the window function used.

12. A method according to claim 1, wherein a transmitted signal by the transmitting antenna array and the received signal are terrestrial signals.

13. A radio system, comprising: a network part, a subscriber terminal and a bi-directional radio link between the network part and the terminal, which is established utilizing an antenna beam directed by an antenna array, and a radio transmitter, comprising means for determining the directions of arrival of a received signal, means for shaping the radiation pattern of a transmitting antenna array on the basis of the directions of arrival of the received signal by selecting a window function which provides the desired radiation pattern and by implementing the form of the window function by means of antenna element specific coefficients, wherein the radio transmitter comprises means for determining the level of side beams in the transmitting antenna array according to the load in the other antenna sectors of the same system and according to the interference level in other radio systems.

14. A system according to claim 13, wherein the radio transmitter comprises means for modifying the radiation pattern of the transmitting antenna array by changing the shape of the main beam.

15. A system according to claim 13, wherein the radio transmitter comprises means for modifying the radiation pattern of the transmitting antenna array by reducing the level of side beams.

16. A system according to claim 13, wherein the radio transmitter comprises means for determining the directions of arrival of the received signal by means of angular spread.

17. A system according to claim 13, wherein the radio transmitter comprises means for determining the directions of arrival of the received signal by means of an angular power spectrum.

18. A system according to claim 13, wherein the radio transmitter comprises means for determining the level of side beams in the transmitting antenna array according to the load in the adjacent antenna sector of the same system.

19. A system according to claim 13, wherein the radio transmitter comprises means for increasing the dynamics of power control by reducing the level of side beams.

20. A system according to claim 13, wherein the radio transmitter comprises means for increasing the dynamics of power control by modifying the main beam.

21. A system according to claim 13, wherein the window function is selected from among pre-tabulated window functions.

22. A system according to claim 13, wherein a signal output of each antenna element of the antenna array is multiplied by coefficients providing the selected window function.

23. A system according to claim 13, wherein the shape of the antenna's radiation pattern is determined by the Fourier transformation of the window function used.

24. A radio transmitter comprising means for determining the directions of arrival of a received signal, means for shaping the radiation pattern of a transmitting antenna array on the basis of the directions of arrival of the received signal by selecting a window function which provides the desired radiation pattern and by implementing the form of the window function by means of antenna element specific coefficients, and means for determining the level of side beams in the transmitting antenna array according to the load in the other antenna sectors of the same system and according to the interference level in other radio systems.

25. A radio transmitter according to claim 24, wherein the radio transmitter comprises means for modifying the radiation pattern of the transmitting antenna array by changing the shape of the main beam.

26. A radio transmitter according to claim 24, wherein the radio transmitter comprises means for modifying the radiation pattern of the transmitting antenna array by reducing the level of side beams.

27. A radio transmitter according to claim 24, wherein the radio transmitter comprises means for determining the directions of arrival of the received signal by means of angular spread.

28. A radio transmitter according to claim 24, wherein the radio transmitter comprises means for determining the directions of arrival of the received signal by means of an angular power spectrum.

29. A radio transmitter according to claim 24, wherein the radio transmitter comprises means for determining the level of side beams in the transmitting antenna array according to the load in the adjacent antenna sector of the same system.

30. A radio transmitter according to claim 24, wherein the radio transmitter comprises means for increasing the dynamics of power control by reducing the level of side beams.

31. A radio transmitter according to claim 24, wherein the radio transmitter comprises means for increasing the dynamics of power control by modifying the main beam.

32. A radio transmitter according to claim 24, wherein the window function is selected from among pre-tabulated window functions.

33. A radio transmitter according to claim 24, wherein a signal output of each antenna element of the antenna array is multiplied by coefficients providing the selected window function.

34. A radio transmitter according to claim 24, wherein the shape of the antenna's radiation pattern is determined by the Fourier transformation of the window function used.

35. A method of improving operation of a radio link, the method comprising using an antenna beam directed by an antenna array to establish a radio link, locating a receiver, shaping the radiation pattern of the transmitter's transmitting antenna array on the basis of the location information on the receiver by defining a number of antenna element specific coefficients which provide the desired width of the main beam as zeros, wherein the level of side beams in the transmitting antenna array is determined according to the load in other antenna sectors of the same system and according to the interference level in other radio systems.

36. A method according to claim 35, wherein the receiver is located by means of time delay information.

37. A method according to Claim 35, wherein the receiver is located by means of distance information.

38. A method according to claim 35, wherein the dynamics of power control is increased by modifying the main beam of the transmitter's transmitting antenna array.

39. A radio system, comprising: a network part, a subscriber terminal and a bidirectional radio link between the network part and the terminal, which is established utilizing an antenna beam directed by an antenna array, and a transmitter comprising means for locating a receiver, means for shaping the radiation pattern of the transmitter's transmitting antenna array on the basis of the location information on the receiver by defining a number of antenna element specific coefficients which provide the desired width of the main beam as zeros, wherein the transmitter comprises means for determining the level of side beams in the transmitting antenna array according to the load in the other antenna sectors of the same system and according to the interference level in other radio systems.

40. A system according to claim 39, wherein the transmitter comprises means for locating a receiving radio device by means of time delay information.

41. A system according to claim 39, wherein the transmitter comprises means for locating the receiving radio device by means of distance information.

42. A system according to claim 39, wherein the transmitter comprises means for increasing the dynamics of power control by modifying the main beam of the transmitting antenna array.

43. A radio transmitter comprising means for locating a receiver, means for shaping the radiation pattern of the transmitter's transmitting antenna array on the basis of the location information on the receiver by defining a number of antenna element specific coefficients which provide the desired width of the main beam as zeros, and means for determining the level of side beams in the transmitting antenna array according to the load in the other antenna sectors of the same system and according to the interference level in other radio systems.

44. A radio transmitter according to claim 43, wherein the transmitter comprises means for locating the receiving radio device by means of time delay information.

45. A radio transmitter according to claim 43, wherein the transmitter comprises means for locating the receiving radio device by means of distance information.

46. A radio transmitter according to claim 43, wherein the transmitter comprises means for increasing the dynamics of power control by modifying the main beam of the transmitting antenna array.

* * * * *